United States Patent
Huang et al.

(10) Patent No.: US 7,101,109 B2
(45) Date of Patent: Sep. 5, 2006

(54) KNOB LOCK MECHANISM WITH SLOT

(75) Inventors: Shih-Chun Huang, Taipei (TW); Chien-Hsun Sun, Taipei (TW)

(73) Assignee: Quanta Computer, Inc., Tao Yuan Hsien (TW)

( * ) Notice: Subject to any disclaimer, the term of this patent is extended or adjusted under 35 U.S.C. 154(b) by 16 days.

(21) Appl. No.: 10/909,332

(22) Filed: Aug. 3, 2004

(65) Prior Publication Data
US 2005/0141958 A1 Jun. 30, 2005

(30) Foreign Application Priority Data
Dec. 24, 2003 (TW) ............... 92136770 A

(51) Int. Cl.
*F16B 21/09* (2006.01)
(52) U.S. Cl. ..................................... 403/315
(58) Field of Classification Search .......... 403/13, 403/14, 348, 350; 361/681, 683; 248/551, 248/917, 52, 225.11, 222.52, 223.41
See application file for complete search history.

(56) References Cited
U.S. PATENT DOCUMENTS

| | | | | |
|---|---|---|---|---|
| 3,564,984 A | * | 2/1971 | Alexander | 359/551 |
| 4,186,902 A | * | 2/1980 | Simons | 248/73 |
| 5,588,625 A | * | 12/1996 | Beak | 248/371 |
| 6,004,065 A | * | 12/1999 | Higdon et al. | 403/384 |
| 6,024,336 A | * | 2/2000 | Lin et al. | 248/371 |
| 6,189,850 B1 | * | 2/2001 | Liao et al. | 248/292.14 |
| 6,378,830 B1 | * | 4/2002 | Lu | 248/278.1 |
| 6,587,333 B1 | * | 7/2003 | Tseng et al. | 361/681 |
| 6,669,156 B1 | * | 12/2003 | East et al. | 248/300 |
| 2002/0071243 A1 | * | 6/2002 | Krispin | 361/679 |
| 2004/0056161 A1 | * | 3/2004 | Ishizaki et al. | 248/176.3 |

* cited by examiner

Primary Examiner—Daniel P. Stodola
Assistant Examiner—Joshua T. Kennedy
(74) Attorney, Agent, or Firm—Rabin & Berdo, PC

(57) ABSTRACT

A stand knob lock is employed to connect a stand plate and a neck frame of an LCD monitor. The stand plate has an opening and two holders. It also includes two ribs and two pins around the opening. The stand knob includes a shaft and two flanges on one side and an "I"-type notch in the opposite side. The shaft of the stand knob is led through the opening of the stand plate and rotated clockwise such that two flanges are secured between the pins and the ribs. The shaft can fit into the slot of the neck frame to connect the stand plate and the neck frame.

14 Claims, 6 Drawing Sheets

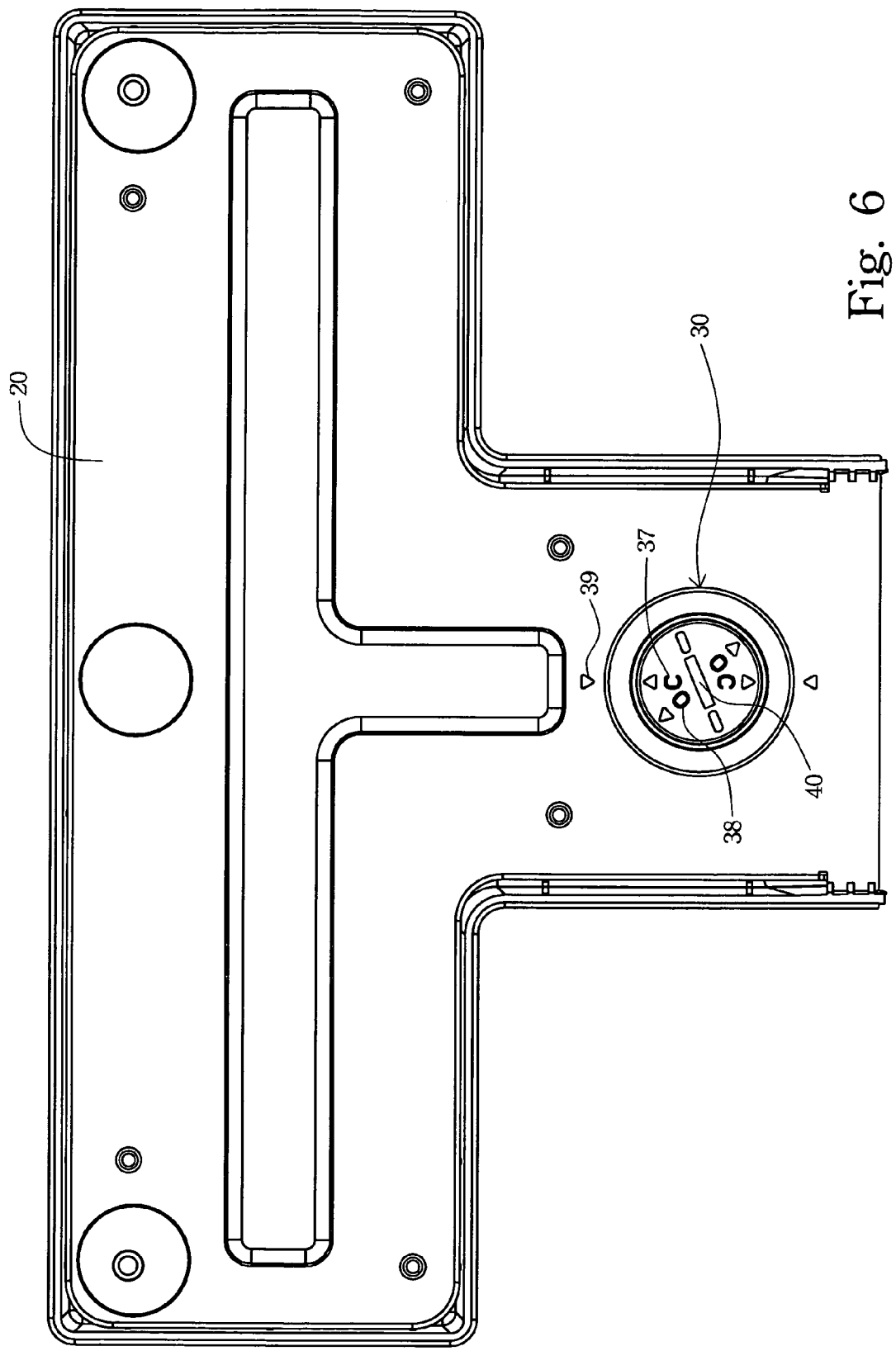

KNOB LOCK MECHANISM WITH SLOT

BACKGROUND

1. Field of Invention

The present invention relates to a knob lock mechanism. More particularly, the present invention relates to a knob lock mechanism to assemble a LCD base.

2. Description of Related Art

As the liquid crystal display (LCD) manufacturing technology advances rapidly, LCD monitors are applied in various fields and replace CRT monitors.

In order to meet various customer demands for an LCD monitor, more products are specialized for specific demands. For instance, an LCD monitor can be installed on a wall by means of a base, which attaches to the wall firmly; some LCD monitors are placed on a desk by means of a normal base, which supports the LCD monitor. Moreover, the height of an LCD monitor pedestal must be adjustable to meet the various needs of desks, persons or chairs of different heights.

Furthermore, a conventional LCD monitor pedestal is usually wider or thicker than the LCD monitor itself. If an LCD monitor and its pedestal are not disassembled for packing, the package size thereof is very large.

SUMMARY

It is therefore an objective of the present invention to provide a knob lock mechanism to allow easy assembly and disassembly of all components of an LCD monitor base.

In accordance with the foregoing and other objectives of the present invention, a stand knob lock is employed to connect a stand plate and a neck frame of an LCD monitor. The stand plate includes an opening and two holders. It also includes two ribs and two pins around the opening. The stand knob includes a shaft and two flanges on one side and an "I"-type notch on the opposite side. The shaft of the stand knob is led through the opening of the stand plate and rotated clockwise such that two flanges are secured between the pins and the ribs. The shaft can fit into the slot of the neck frame to connect the stand plate and the neck frame.

Therefore, assembly and disassembly of an LCD base by means of the knob lock mechanism are fast and easy. The total package volume of the disassembled LCD base components is decreased.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 6 illustrates a bottom view of a stand plate according to one preferred embodiment of this invention.

DESCRIPTION OF THE PREFERRED EMBODIMENTS

Figure 1:
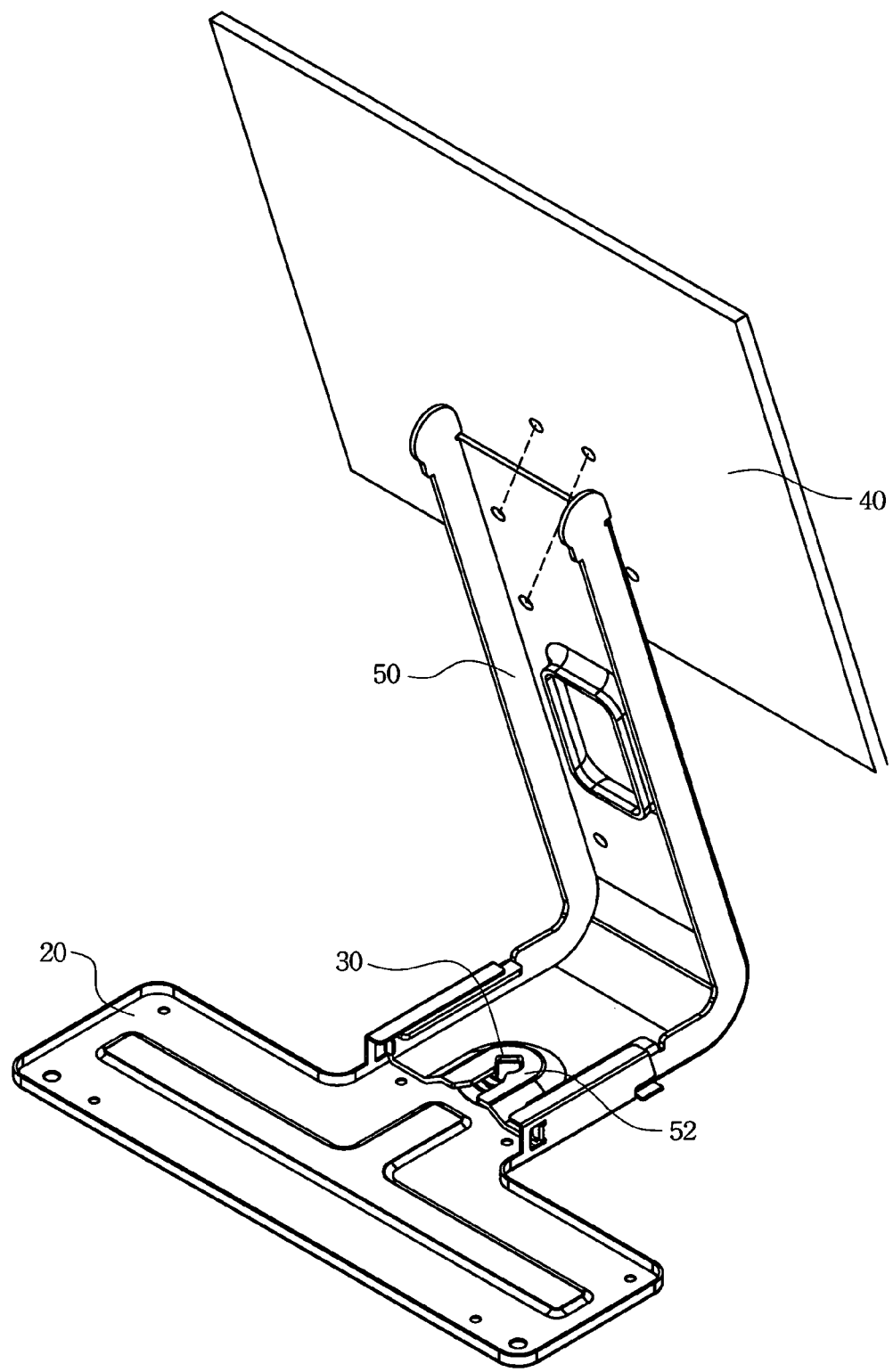
FIG. 1 illustrates a perspective view of a knob lock mechanism according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

In order to reduce the package size of an LCD monitor, a knob lock mechanism is employed to assemble the LCD base. The knob lock mechanism provides not only an easy way to assemble the LCD support, but also a quick way to take apart the LCD support.

FIG. 1 illustrates a perspective view of a knob lock mechanism according to one preferred embodiment of this invention. The knob lock mechanism includes a neck frame 50, a stand knob 30 and a stand plate 20. The neck frame 50 is used to connect and support an LCD monitor 40. A stand plate 20 serves as a support base upon a desk. The stand knob 30 is employed t connect the neck frame 50 and the stand plate 20.

Figure 2:
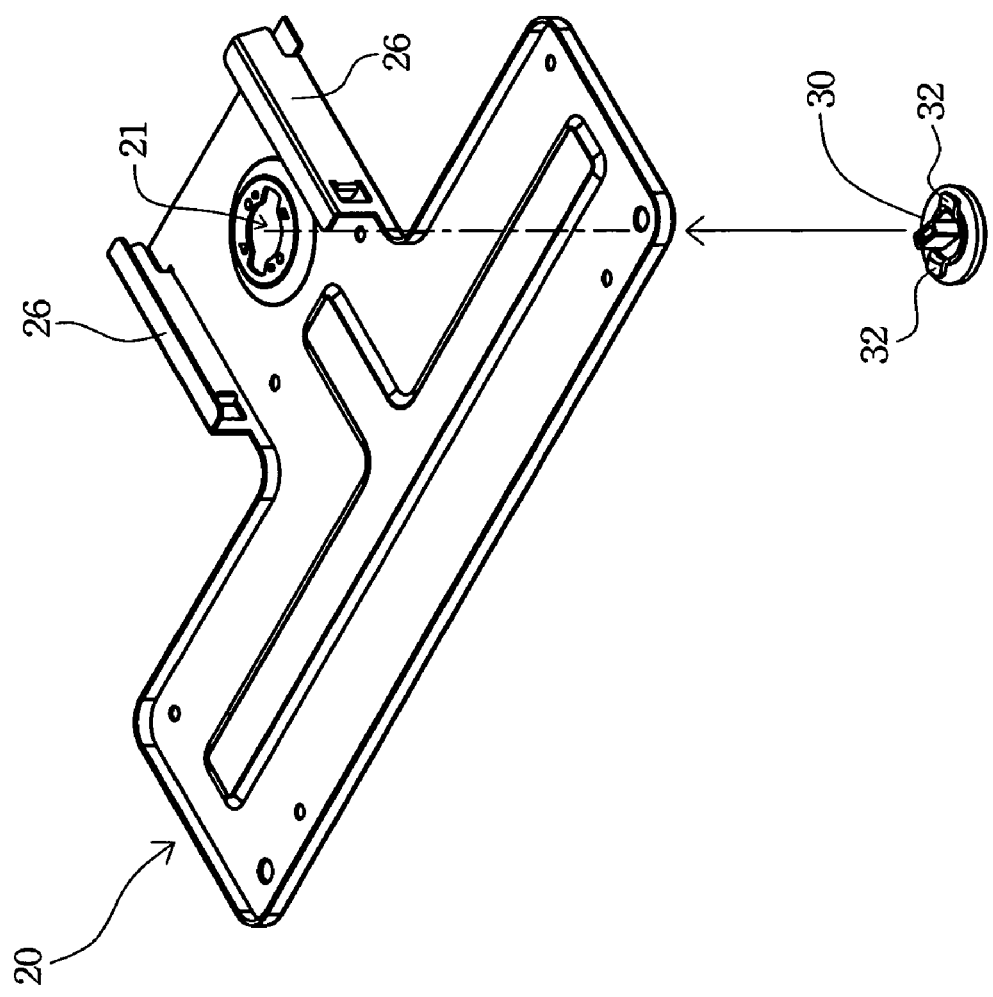
FIG. 2 illustrates a perspective view of a stand plate and a stand knob before assembly according to one preferred embodiment of this invention.

FIG. 2 illustrates a perspective view of a stand plate 20 and a stand knob 30 before assembly according to one preferred embodiment of this invention. The stand plate 20 is a flat metal plate shaped into a model illustrated in FIG. 2. The stand plate 20 has an opening 21 in which the stand knob 30 fits and two holders 26 to clamp the neck frame 50. The stand knob 30 includes two flanges 32 to connect with the stand plate 20. A material of the stand plate 20 is not limited to metal. Other materials, such as plastic, may be used to form the stand plate 20.

Figure 3A:
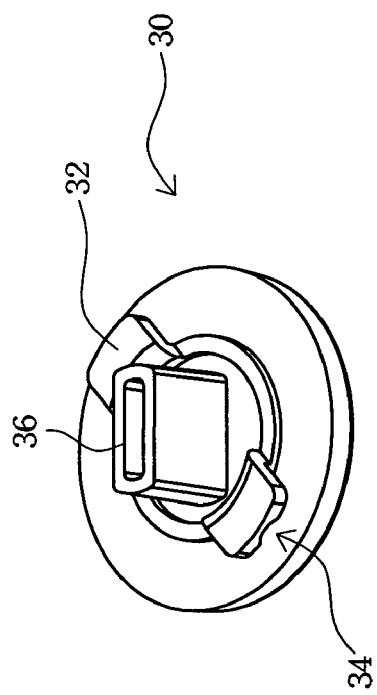
FIGS. 3A, 3B, 3C and 3D respectively illustrate two top and two side views of a stand knob according to one preferred embodiment of this invention.
Figure 3B:
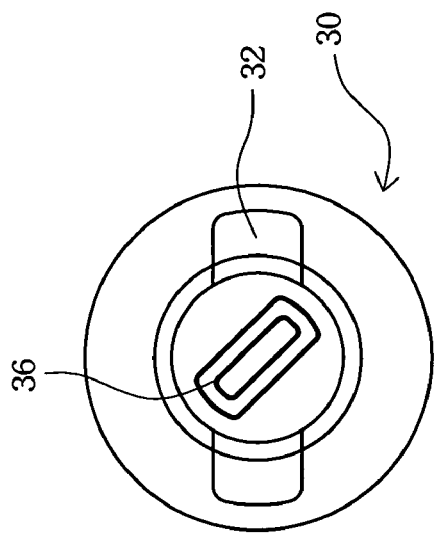
Figure 3C:
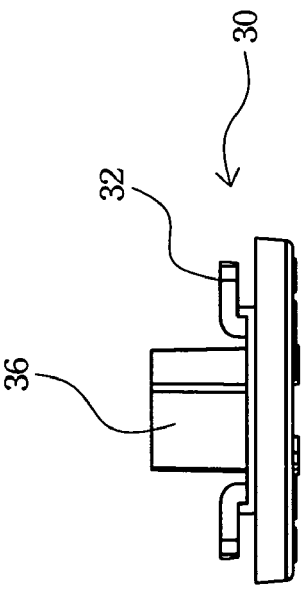
Figure 3D:
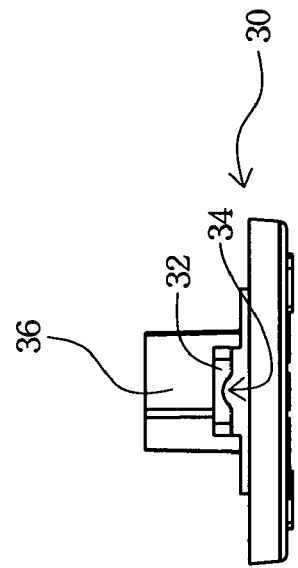

FIGS. 3A, 3B, 3C and 3D respectively illustrate two top and two side views of a stand knob according to one preferred embodiment of this invention. In FIG. 3B, the stand knob 30 includes two flanges 32 and a shaft 36. The flange 32 is employed to connect with the stand plate 20. Referring to FIG. 3D, the flange 32 includes a recess 34 to fit upon the stand plate 20.

Figure 4:
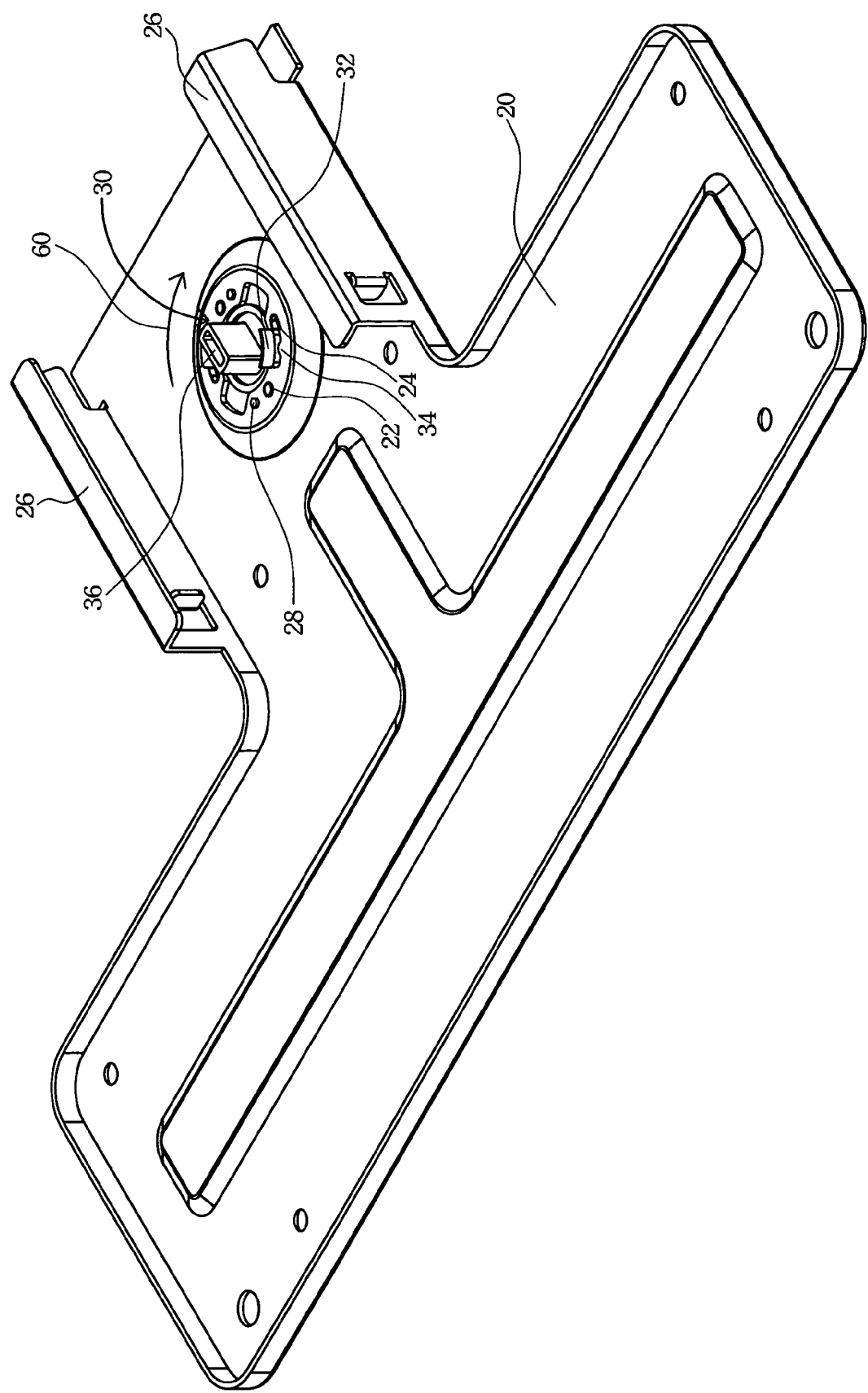
FIG. 4 illustrates a perspective view of a stand plate and a stand knob after assembly according to one preferred embodiment of this invention.

FIG. 4 illustrates a perspective view of a stand plate and a stand knob after assembly according to one preferred embodiment of this invention. The shaft 36 and the flange 32 of the stand knob 30 are led through an opening 21 of the stand plate 20, and the stand knob 30 is rotated to enable the flange 32 to go beyond the rib 24 according to a direction 60. One side of the rib 24 is a sliding surface assisting the flange 32 to go beyond the rib 24. The opposite side of the rib 24 is a vertical surface stopping the flange 32 from moving backward beyond the rib 24. The flange 32 is an elastic structure such that it can easily go beyond the rib 24. The flange 32 is positioned between the rib 24 and a stop pin 28 after the stand knob 30 and the stand plate 20 are assembled.

Figure 5:
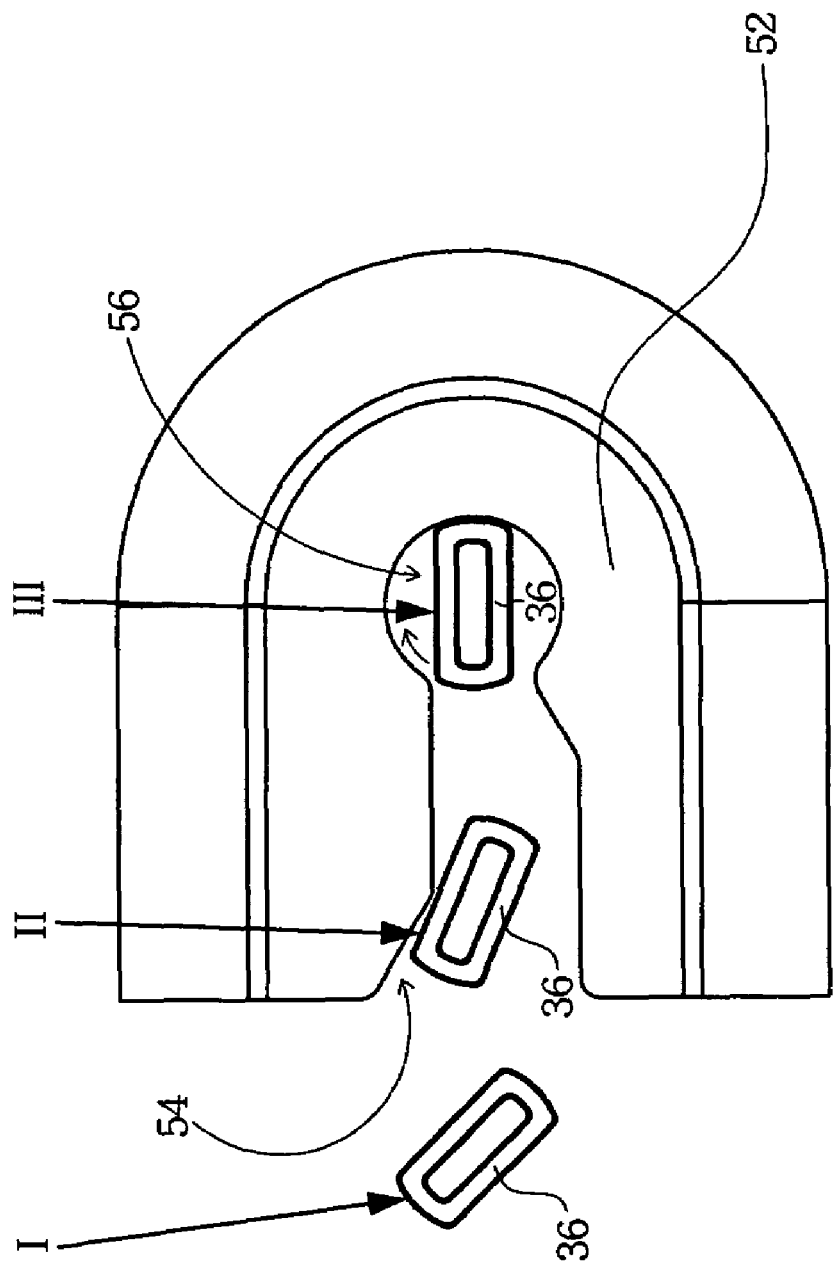
FIG. 5 illustrates three phases of how a shaft of a stand knob fits into a slot of a neck frame according to one preferred embodiment of this invention.

FIG. 5 illustrates three phases of how a shaft of a stand knob fits into a slot of a neck frame according to one preferred embodiment of this invention. The shaft 36 of the stand knob 30 fits into the slot 52 of the neck frame 50 according three phases illustrated in FIG. 5. The slot 52 includes an incomplete round hole 56 and a bevel 54 at the inlet of the slot. The bevel 54 is employed to correct or adjust a direction of the shaft 36 while the shaft 36 is being inserted into the slot 52. FIG. 5 shows that the slot 52 is constricted at the opening to the round hole 56, and the main portion of the slot 52 is aligned off-center to the round hole 56. The shaft 36 direction of phase II is transferred into the shaft 36 direction of phase III. The shaft 36 direction of phase III is an optimum way for the shaft itself to fit into the slot 52 of the neck frame 50. In order to secure the stand knob 30, the stand plate 20 and the neck frame 50 together, the stand knob 30 is rotated clockwise to prevent itself from moving backward. When the recess 34 of the stand knob 30 fits upon a holding pin 22 of the stand plate 20, the stand knob 30 is fixed (not rotatable with ease) and assembly procedures are completed.

FIG. 6 illustrates a bottom view of a stand plate according to one preferred embodiment of this invention. In order to make the stand knob 30 easily rotated by a user, the bottom side of the stand knob 30 includes an "I"-type notch 40. A user can insert a coin into the "I"-type notch 40 to assist rotating the stand knob 30. The coin and the "I"-type notch 40 help a user easily rotate the stand knob 30. Alignment of a sign "C" (close) on the bottom side of the stand knob 30 with an arrow 39 represents that the stand plate 20 and the neck frame 50 have been secured and locked. Alignment of a sign "O" (open) on the bottom side of the stand knob 30 with an arrow 39 represents that the stand plate 20 and the neck frame 50 can be taken apart.

According to the preferred embodiment of present invention, assembly and disassembly of an LCD base are easy and quick by means of the knob lock mechanism. Total package volume of the LCD base components after disassembly is decreased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A knob lock mechanism for assembling an LCD monitor, said knob lock mechanism comprising:
    a stand plate serving as a base, having an opening, a rib, and a stop pin, wherein said rib and said stop pin are positioned around said opening;
    a stand knob, having a shaft and a flange on one side, said shaft being led through said opening and being rotated until said flange is positioned between said rib and said stop pin; and
    a neck frame for connecting and supporting said LCD monitor, including an open-ended slot at one end of the frame to slidingly engage said knob shaft and then clamp said shaft within;
    wherein a shape of said slot comprises a first portion having an open end to slidingly engage said stand knob shaft and a second portion having a reduced neck portion to clamp said shaft within.

2. The knob lock mechanism of claim 1, wherein said flange comprises a recess to fit upon a holding pin to prevent said knob from rotating.

3. The knob lock mechanism of claim 1, wherein said rib comprises a sliding surface on one side and a vertical surface on an opposite side thereof.

4. The knob lock mechanism of claim 1, wherein said stand knob comprises an "I"-type notch in an opposite side thereof.

5. The knob lock mechanism of claim 1, wherein said stand plate further comprises two holders to secure said frame.

6. The knob lock mechanism of claim 1, wherein said second portion of said slot comprises an incomplete round hole and said first portion comprises a bevel at an inlet of said slot.

7. A knob lock mechanism employed to assemble a monitor base, said knob lock mechanism comprising:
    a stand plate, having an opening, two holders, a rib, and a stop pin, wherein said rib and said stop pin are positioned around said opening;
    a stand knob, having a shaft and a flange on one side, an "I"-type notch in an opposite side, wherein said shaft is led through said opening and rotated until said flange is positioned between said rib and said stop pin; and
    a neck frame, including an open-ended slot at one end of the frame, said slot further comprising a first portion having an open end to slidingly engage said stand knob shaft and a second portion having a reduced neck portion to clamp said shaft within, wherein part of said neck frame is secured by said two holders while said slot clamps said shaft.

8. The knob lock mechanism of claim 7, wherein said flange comprises a recess to fit upon a holding pin to prevent said knob from rotating.

9. The knob lock mechanism of claim 7, wherein said rib comprises a sliding surface on one side and a vertical surface on an opposite side.

10. The knob lock mechanism of claim 7, wherein said second portion of said slot comprises an incomplete round hole and said first portion comprises a bevel at an inlet of said slot.

11. The knob lock mechanism of claim 10, wherein said second portion is constricted at the opening to the round hole.

12. The knob lock mechanism of claim 11, wherein the main portion of said first portion is aligned off-center to the round hole.

13. The knob lock mechanism of claim 6, wherein said second portion is constricted at the opening to the round hole.

14. The knob lock mechanism of claim 13, wherein the main portion of said first portion is aligned off-center to the round hole.

* * * * *